Figure 1:
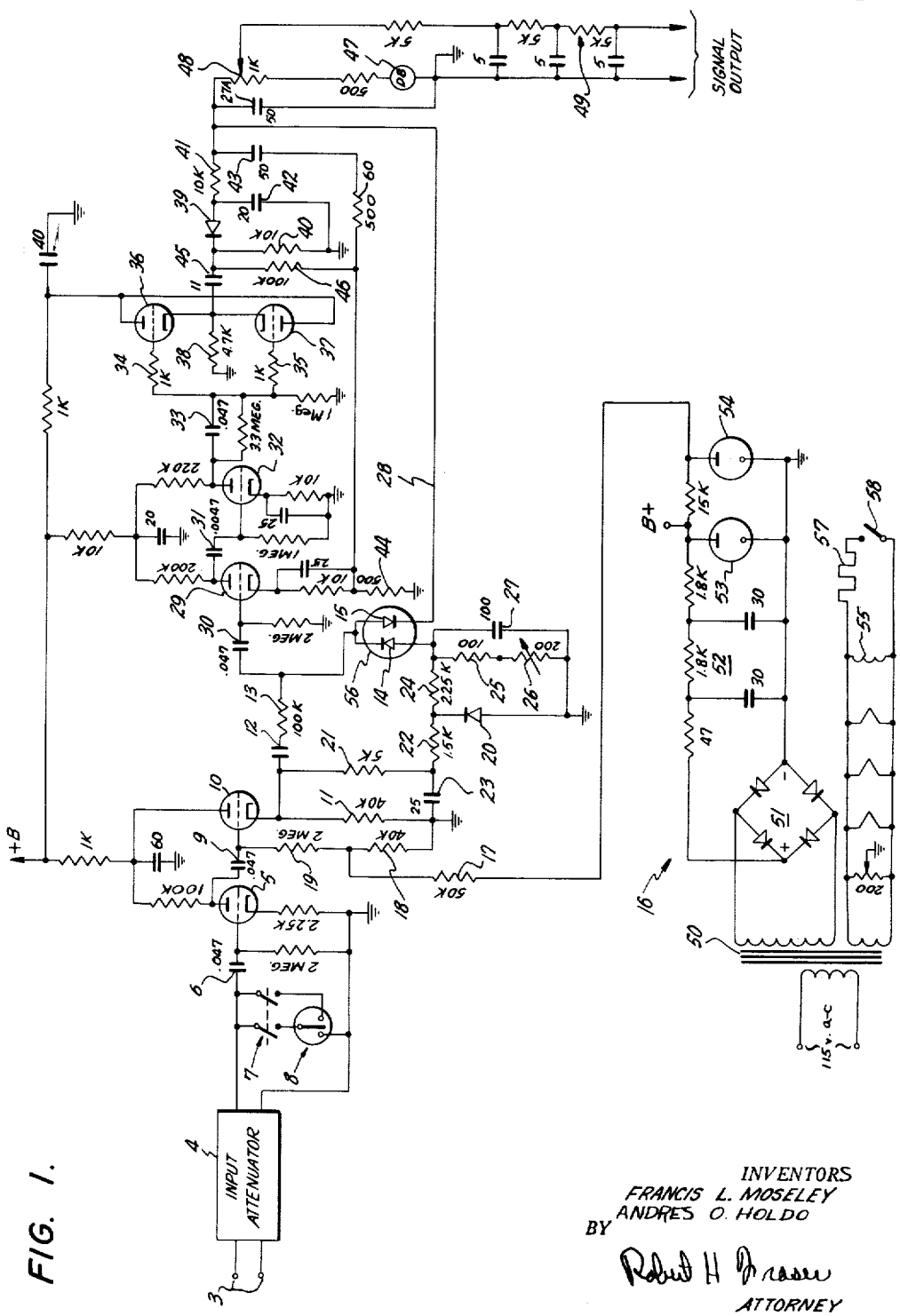

March 14, 1961

F. L. MOSELEY ET AL 2,975,370

LOGARITHMIC CONVERTERS

Filed Oct. 5, 1956

2 Sheets-Sheet 1

INVENTORS
FRANCIS L. MOSELEY
ANDRES O. HOLDO
BY
Robert H. Brauer
ATTORNEY

United States Patent Office 2,975,370
Patented Mar. 14, 1961

2,975,370
LOGARITHMIC CONVERTERS

Francis L. Moseley and Andres O. Holdo, Pasadena, Calif., assignors to F. L. Moseley Co., a corporation of California Filed Oct. 5, 1956, Ser. No. 614,238

5 Claims. (Cl. 328—145)

This invention relates to electrical signal translation systems, and more particularly to an electrical signal translation system for providing a unidirectional output signal which is a logarithmic function of the amplitude of an input signal.

In the recording of data collected in the course of scientific investigation and testing, it is well known to plot the relationship between variable quantities to provide a a graphical illustration. Frequently, it is desirable to plot a logarithmic function of a variable quantity rather than the absolute magnitude of the variable quantity. For example, in the measurement of the characteristics of an electrical signal filter, it is common practice to plot the amplitude of waves passed by the filter as a function of the frequency of the waves. In many instances, the amplitude values to be recorded vary over a wide range so that when the graphical illustration is confined within reasonable dimensions, relatively small variations are diminished or lost. To provide a better illustration of small variations, one or more of the variable quantities may be graphed in accordance with a logarithmic function of the variable quantity.

In addition, logarithmic plotting is used where the measurement units are logarithmic by nature e.g. the standard unit of sound intensity, the decibel, is logarithmic by nature.

Although recording instruments are available for automatically graphing the relationship between two variable quantities, such instruments generally respond in a linear fashion to the value of the signal representing the variable and do not provide any means for graphing the logarithm of the variable.

Accordingly, it is an object of the present invention to provide a logarithmic converter which generates an output signal representing the logarithm of the amplitude of an input signal for use in connection with graphical recording equipment.

In addition to the need for a logarithmic converter for use in connection with graphical recording equipment, a device for generating a logarithmic output signal is particularly useful in the field of analog computers, where a logarithmic converter may serve as an operational amplifier to simulate a physical phenomenon or to perform a required mathematical operation.

Accordingly, it is a further object of the present invention to provide a logarithmic converter which may be used as an operational amplifier to generate output signals bearing a logarithmic relationship to an input signal.

Briefly, the present invention includes apparatus in which a circuit in the signal transfer path has a fixed value impedance and a variable value impedance, the signal appearing across the variable value impedance is amplified, the amplified signals are rectified, an output circuit is coupled to the rectifying means, and the value of the variable impedance is caused to fluctuate whereby a signal appearing in the output circuit represents a logarithmic function of the amplitude of a signal applied to the input circuit.

Figure 2:
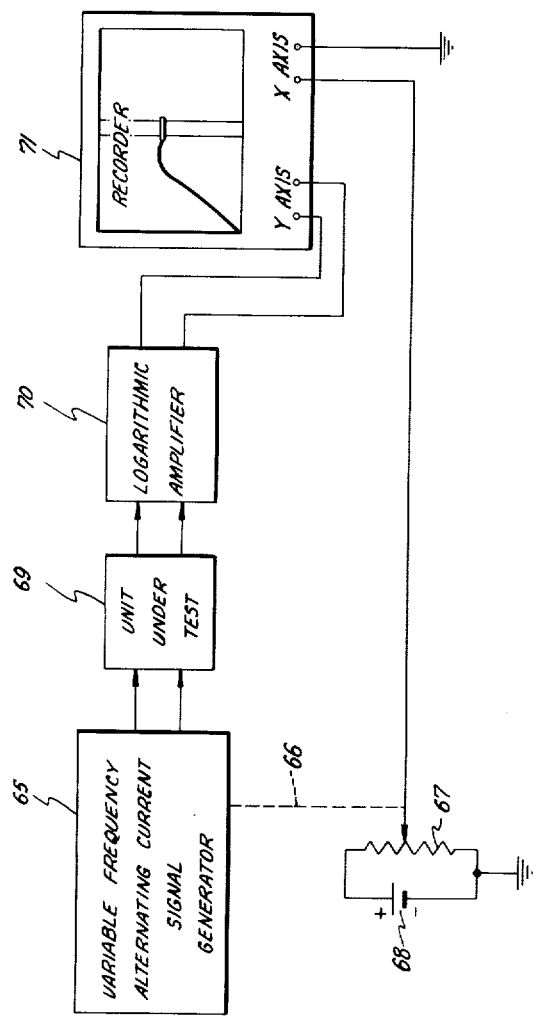

A better understanding of the invention may be had upon a reading of the following detailed description and an inspection of the drawings in which:

Fig. 1 is a schematic circuit diagram of a logarithmic converter including an illustrative embodiment of the invention; and Fig. 2 is a block diagram illustrating the manner in which the logarithmic converter of the invention may be used to advantage in connection with a graphic recorder.

In Fig. 1 an input signal may be applied to an input attenuator 4 from a pair of input terminals 3. The input attenuator 4 may be a calibrated step-type attenuator which is adapted to accept a relatively wide range of input signal amplitudes and to provide an output signal within the range of operation of the remainder of the apparatus of Fig. 1. In the case where alternating current signals of different frequencies are applied to the input terminals 3, the input attenuator 4 should be compensated to produce an output signal which does not vary with frequency over the range of frequencies involved.

The output signal from the input attenuator 4 is applied to the control electrode of an amplifying electron tube 5 via a coupling capacitor 6. Where an alternating current input signal is employed, the double-pole single-throw switch 7 should be open. On the other hand, when the input signal is unidirectional in character, the double-pole single-throw switch 7 may be closed to connect a vibrator type interrupter 8 across the output of the input attenuator 4. In operation, the vibrator 8 intermittently opens and closes to convert a unidirectional signal to an alternating current signal for application to the control electrode of the electron tube 5.

The amplified signal appearing at the anode of the electron tube 5 is passed via a coupling capacitor 9 to a control electrode of a cathode follower electron tube 10. The signal appearing across a cathode resistor 11 associated with the electron tube 10 is passed by a coupling capacitor 12 and applied across a fixed impedance and a variable impedance which are serially connected. The fixed impedance may comprise a resistor 13, and the variable impedance may comprise the diodes 14 and 15.

In order to maintain the diodes 14 and 15 in a conducting condition, a forward acting unidirectional biasing voltage of constant value is connected serially between the diode 14 and ground reference potential. Although a battery or other conventional source of unidirectional voltage may be employed, in the embodiment of Fig. 1 the unidirectional voltage is derived from a conventional power supply.

In operation, a relatively constant unidirectional voltage is taken from a power supply 16 and applied to a voltage divider comprising a resistor 17 and a resistor 18. At the junction point between the resistors 17 and 18 a voltage is derived which is applied to the control electrode of the electron tube 10 via a resistor 19. The voltage applied to the control electrode of electron tube 10 causes a relatively constant current to flow through the electron tube 10 with the result that a unidirectional voltage appears across the cathode resistor 11 along with the signal. In order to provide a biasing voltage of uniform and constant value the voltage appearing across the cathode resistor 11 is applied to a Zener diode 20 via the resistors 21 and 22. A bypass capacitor 23 provides a low impedance path for alternating current signals appearing at the lower end of the resistor 21. As is well known, a Zener diode may be used as a voltage regulator to maintain a constant voltage. In Fig. 1, the Zener diode 20 maintains the voltage appearing at the junction of the voltage divider resistors 24 and 25 at a suitable constant biasing voltage to render the diodes 14 and 15 conducting. The resistor 26 is adjustable to set the value of the biasing voltage at a selected value.

A capacitor 27 provides additional filtering of the biasing voltage and acts as a low impedance path to ground for alternating signal currents passed by the diode 14. In like fashion, a capacitor 27A in the output circuit provides a low impedance path for alternating signal currents passed by the diode 15 so that for alternating currents, the diodes 14 and 15 are effectively connected in parallel between the resistor 13 and ground reference potential.

By means of a connection 28 from the output circuit of the apparatus of Fig. 1 to the diode 15, a variable control current flows through the diodes 14 and 15. Since the impedance of a diode is a function of the current flowing through the diode the signal passed by the capacitor 12 divides across the fixed impedance provided by the resistor 13 and the variable impedance provided by the diodes 14 and 15 in accordance with the amount of control current flowing through the diodes 14 and 15. Hence the amplitude of the signal applied to the control electrode of an amplifying electron tube 29 via a coupling capacitor 30 may be varied by controlling the condition of conduction of the diodes 14 and 15 so that more or less of the signal passed by the capacitor 12 appears across the fixed impedance of the resistor 13.

The signal appearing at the anode of the electron tube 29 is passed via a coupling capacitor 31 to the control electrode of a conventional amplifying tube 32, and the signal appearing at the anode of the electron tube 32 is passed via a coupling capacitor 33 and the resistors 34 and 35 to like control electrodes of a pair of parallel connected cathode follower electron tubes 36 and 37. The output signal from the electron tubes 36 and 37 appears across a common cathode resistor 38 which is shared by the electron tubes 36 and 37.

In order to provide a unidirectional output signal the alternating current signal appearing across the cathode resistor 38 is applied to a rectifier and filter circuit including a diode 39, the resistors 40 and 41 and the capacitors 42 and 43.

The amplifier includes an inverse feedback connection between a cathode resistor 44 and the output of the electron tubes 36 and 37 via a capacitor 45 and a resistor 46 to improve stability. In addition, a connection from the capacitor 43 to the cathode resistor 44 via a resistor 60 improves the transient response of the amplifier.

The unidirectional signal provided by the rectifier and filter circuit may be measured directly across the output circuit by means of a logarithmic reading meter 47. A portion of the output voltage may be taken from a potentiometer 48 and passed through a three section smoothing filter 49, to minimize any alternating current component of the output signal which might otherwise disturb the terminal equipment, such as a graphic recorder.

In operation, a portion of the unidirectional voltage provided by the rectifier and filter circuit is applied to the diodes 14 and 15 via the connection 28. Due to the change in impedance of the diodes 14 and 15 as a function of current flow, the fraction of the signal which is applied to the electron tube 29 is controlled in such a way as to provide a unidirectional output signal which bears a logarithmic relationship to the input signal. Thus, as the output unidirectional voltage increases, the amount of control current flowing through the diodes 14 and 15 via the connection 28 increases. The voltage-current characteristic of the diodes is ordinarily somewhat exponential so that the impedance presented to the flow of current is lowered as the current increases. Accordingly, a smaller fractional part of the alternating current signal appears across the diodes 14 and 15 and hence, a smaller fractional part of the alternating current signal is applied to the control electrode of the electron tube 29. In practice, it has been found that the relationship between the magnitude of the unidirectional output signal and the amplitude of the alternating current signal closely approximates a logarithmic function due to the variable impedance afforded by the diodes 14 and 15 operating in conjunction with the fixed impedance of the resistor 13. By suitably positioning the switch 7 of Fig. 1 connecting the vibrator in the circuit, the apparatus may be adapted to provide unidirectional logarithmic output signals corresponding to either unidirectional input signals or alternating current input signals.

The power supply 16 illustrates one conventional way of energizing the logarithmic amplifier of Fig. 1 from a source of alternating current. The power supply 16 includes a conventional transformer 50, a bridge rectifier 51 and a filter circuit 52. The anode voltages for the electron tubes of the logarithmic amplifier may be taken from a filter circuit 52 via a first voltage regulating tube 53, and the aforementioned unidirectional voltage for application to the control electrode of the electron tube 10 may be taken from the output of the filter 52 via the first voltage regulating tube 53 and a second voltage regulating tube 54. Current for the heater windings of the electron tubes of the logarithmic amplifier may be taken from a winding on the transformer 50 as shown. In addition, an energizing coil 55 associated with the vibrator 8 may be connected across the source of heater current.

In a preferred embodiment of the invention, the diodes 14 and 15 may comprise conventional silicon diodes which are maintained at a constant temperature in a thermostatically controlled oven illustrated diagrammatically at 56. The temperature within the oven 56 is maintained constant by means of a heater coil 57 connected serially with a temperature responsive switch 58, both of which may be connected serially across the source of heater current as shown.

Although specific values are given for the circuit components of the apparatus of Fig. 1, it is understood that the values are given by way of example, being indicative of one workable embodiment. In Fig. 1, the values of the resistors are given in ohms (where K equals 1000 and Meg. equals 1,000,000) and the values of the capacitors are given in micro-farads. Electron tubes 5, 10, 36 and 37 may each comprise a triode section of a double triode tube such as type 12AU7 and the electron tubes 29 and 32 may comprise triode sections of a double triode tube, such as a type 12AX7. The voltage regulator tube 53 may comprise a type 5651 and the voltage regulator tube 54 may comprise a type OA2.

One way in which the logarithmic amplifier of Fig. 1 may be used to advantage in connection with a graphical recorder is illustrated in Fig. 2. In Fig. 2, a variable frequency alternating current signal generator 65 is adapted to supply an alternating current wave of constant amplitude and variable frequency. Generally, conventional alternating current signal generators include a shaft which may be rotated to vary the frequency of the wave supplied. In Fig. 2, the dashed line 66 indicates a mechanical linkage between the frequency control shaft of the signal generator 65 and a contactor on a potentiometer 67. By impressing a voltage from a battery 68 across the resistance element of the potentiometer 67, the voltage taken from the contactor of the potentiometer 67 is a function of the frequency of the wave supplied by the signal generator 65.

The alternating current wave from the signal generator 65 is passed to a unit under test 69, such as, for example, an electrical filter. The wave appearing at the output of the unit under test 69 will vary in amplitude as the frequency of the wave varies in accordance with the signal transfer characteristic of the unit under test 69.

The wave passed by the unit under test 69 is applied to the input of a logarithmic amplifier 70 which corresponds to the apparatus shown in Fig. 1. At the output of the logarithmic amplifier 70 appears a unidirectional voltage representing a logarithmic function of the amplitude of the wave passed by the unit under test 69.

By applying the voltage from the logarithmic amplifier 70 to the Y-axis input of a graphic recorder 71, and by applying the voltage from the potentiometer 67 to the X-axis input of the recorder 71, the signal transfer characteristic of the unit under test 69 may be automatically plotted. Due to the action of the logarithmic amplifier 70, the Y-axis scale of the graph made by the recorder 71 will be logarithmic. In addition, where the frequency of the wave from the signal generator 65 is a logarithmic function of the position of the signal generator frequency control shaft, the X-axis scale of the graph will be logarithmic.

Although Fig. 2 illustrates one way in which the apparatus of Fig. 1 may be used to advantage in graphing the signal transfer characteristic of a unit under test 69, it will be appreciated that the invention is not limited thereto. For example, the apparatus of Fig. 1 may be used to advantage as an operational amplifier in an analog computer. Modifications to adapt the apparatus to other desired uses may be made without departing from the invention.

What is claimed is:

1. A logarithmic converter including a circuit adapted to provide a unidirectional output voltage representing a logarithmic function of an input signal, including in combination, an input circuit including a fixed value impedance and a variable value impedance which is controllable to provide an exponential characteristic, means amplifying signals appearing across said variable value impedance, means rectifying the amplified signals provided by said amplifying means, an output circuit coupled to said rectifying means across which appears a unidirectional voltage, and means continuously controlling the variable value impedance coupled between said output circuit and said variable impedance to cause the value of said variable impedance to fluctuate exponentially in accordance with the unidirectional voltage appearing across the output circuit in a sense such that the output signal represents a logarithmic function of the amplitude of signals applied to said input circuit.

2. A logarithmic converter having an input circuit and an output circuit across which appears a unidirectional voltage representing a logarithmic function of the amplitude of a signal applied to the input circuit, including the combination of a signal attenuation circuit coupled to said input circuit, said signal attenuation circuit comprising a fixed impedance and a pair of semiconductor diodes each having an approximately exponential voltage-current characteristic and having unlike electrodes connected to the fixed impedance, a source of substantially constant biasing voltage connected to a first one of the diodes and maintaining a sufficient voltage to render the diodes conductive, means amplifying signals appearing across the diodes, means rectifying the amplified signals, an output circuit coupled to the rectifying means across which a substantially unidirectional voltage appears, and means coupling the output circuit to the second of the pair of diodes to pass a control current through the diodes in accordance with the unidirectional output signal, thus to utilize the voltage-current characteristics of the diodes to change the impedance presented by the diodes whereby the input signal is attenuated by the signal attenuation circuit and the unidirectional voltage appearing at the output circuit represents a logarithmic function of a signal applied to the input circuit.

3. A logarithmic converter adapted to provide a unidirectional output voltage which represents a logarithmic function of the amplitude of an input signal including the combination of a fixed resistance, a pair of oppositely poled semiconductor diodes connected in series parallel with the fixed resistance, each of the diodes having a substantially exponential voltage-current characteristic in a selected voltage-current region, means applying an alternating signal current to the series parallel combination of the fixed resistance and the oppositely poled diodes, an amplifier coupled to the diodes for amplifying a fractional part of the alternating current signal appearing across the diodes, a rectifier coupled to the amplifier for providing a unidirectional voltage in response to the amplified signal from the amplifier, a source of substantially constant biasing voltage connected serially with one of the diodes and maintaining the voltage of the diodes at a level to maintain a steady state current flow through the diodes in the selected voltage-current region, an output circuit coupled to the rectifier across which appears the unidirectional voltage, and means coupling the output circuit to the other of the diodes for passing a control current through the diodes in a sense to lower the impedance presented by the diodes as the control current is increased, whereby the portion of the alternating current signal appearing across the diodes is varied due to the change in impedance presented by the diodes to cause the unidirectional voltage appearing in the output circuit to bear a logarithmic relationship to the amplitude of the alternating current signal applied across the series parallel combination of the fixed resistance and the diodes.

4. A logarithmic converter for a graphical recorder responsive to unidirectional voltage signals comprising a source of signals to be converted, rectifying means for developing a unidirectional output voltage, and means for continuously varying said unidirectional output voltage in accordance with the logarithm of the magnitude of the input signals comprising a voltage dividing network connected to the signal source and having a variable impedance which is exponentially related to current therethrough, means for maintaining one side of said impedance at a substantially constant potential, means for maintaining the other side of the variable impedance at the potential of the unidirectional output voltage, and means for applying the voltage developed across the variable impedance to the rectifying means.

5. In a system for recording a function which corresponds to the logarithm of the magnitude of a variable input signal including a graphical recorder having signal input channels corresponding to graph coordinates and responsive to direct voltage signals, and an arrangement for producing signals to be plotted on a logarithmic scale by the recorder, a logarithmic converter adapted to provide a unidirectional output voltage which represents a logarithmic function of the amplitude of an input signal characterized by the combination of a fixed resistance, a pair of oppositely poled semiconductor diodes connected in series parallel with the fixed resistance, each of the diodes having a substantially exponential voltage current characteristic in a selected voltage current region, means applying an alternating current signal to the series parallel combination of the fixed resistance and the oppositely poled diodes, an amplifier coupled to the diodes for amplifying a fractional part of the alternating current signal appearing across the diodes, a rectifier coupled to the amplifier for providing a unidirectional voltage in response to the amplified signal from the amplifier, a source of substantially constant biasing voltage connected serially with one of the diodes and maintaining the voltage of the diodes at a level to maintain a steady state current flow through the diodes at the selected voltage current region, an output circuit coupled to the rectifier across which appears a unidirectional voltage, and means coupling the output circuit to the other of the diodes in a sense to lower the impedance presented by the diodes as the control current is increased for passing a control current through the diodes whereby the portion of the alternating current signal appearing across the diodes is varied to cause the unidirectional voltage appearing at the output circuit to bear a logarithmic relationship to the amplitude of the alternating current signal applied across the series parallel combination of the fixed resistance and the diodes.

(References on following page)

References Cited in the file of this patent

UNITED STATES PATENTS

| | | |
|---|---|---|
| 2,259,532 | Nicolson | Oct. 21, 1941 |
| 2,329,558 | Scherbatskoy | Sept. 14, 1943 |
| 2,342,238 | Barney | Feb. 22, 1944 |
| 2,400,326 | Wolf | May 14, 1946 |
| 2,554,905 | Hawkins et al. | May 29, 1951 |
| 2,663,002 | McManis et al. | Dec. 15, 1953 |
| 2,683,806 | Moody | July 13, 1954 |
| 2,757,281 | LeBel | July 31, 1956 |
| 2,877,348 | Wade et al. | Mar. 10, 1959 |

OTHER REFERENCES (Pub.) "Logarithmic Amplifier With Fast Response," Electronics, March 1954, pp. 190, 191.